US012558802B2

(12) United States Patent
Lunde et al.

(10) Patent No.: US 12,558,802 B2
(45) Date of Patent: Feb. 24, 2026

(54) INTEGRATED LOCK MECHANISM FOR AN ARTICULATING ARM

(71) Applicant: Ergotron, Inc., St. Paul, MN (US)

(72) Inventors: David Martin Lunde, Eagan, MN (US); Ismail Akharas, Minneapolis, MN (US); Tony Peng, Dongguan (CN)

(73) Assignee: Ergotron, Inc., St. Paul, MN (US)

( * ) Notice: Subject to any disclaimer, the term of this patent is extended or adjusted under 35 U.S.C. 154(b) by 86 days.

(21) Appl. No.: 18/510,988

(22) Filed: Nov. 16, 2023

(65) Prior Publication Data

US 2024/0181659 A1 Jun. 6, 2024

Related U.S. Application Data

(60) Provisional application No. 63/385,892, filed on Dec. 2, 2022.

(51) Int. Cl.
*F16M 13/00* (2006.01)
*B25J 18/00* (2006.01)

(52) U.S. Cl.
CPC .................................... *B25J 18/00* (2013.01)

(58) Field of Classification Search
CPC ................................ B25J 18/00; F16M 13/00
See application file for complete search history.

(56) References Cited

U.S. PATENT DOCUMENTS

| | | | |
|---|---|---|---|
| 4,625,731 A | 12/1986 | Quedens et al. | |
| D340,770 S | 10/1993 | Ohnuma et al. | |
| 5,924,988 A | 7/1999 | Burris et al. | |
| 5,941,824 A | 8/1999 | Hwang | |
| 6,663,569 B1 | 12/2003 | Wilkins et al. | |
| 6,669,639 B1 | 12/2003 | Miller et al. | |
| 7,775,485 B2 | 8/2010 | Asai et al. | |
| 8,056,874 B2 * | 11/2011 | Goodwin | A61G 5/10 |
| | | | 403/112 |
| 8,424,822 B2 | 4/2013 | Suda et al. | |
| 8,579,818 B2 | 11/2013 | Asai et al. | |
| 8,931,748 B2 * | 1/2015 | Bowman | F16M 13/022 |
| | | | 248/917 |

(Continued)

FOREIGN PATENT DOCUMENTS

| | | |
|---|---|---|
| CN | 108779891 B | 2/2021 |
| EP | 1713396 B1 | 7/2011 |

(Continued)

*Primary Examiner* — Amy J. Sterling
(74) *Attorney, Agent, or Firm* — Schwegman Lundberg & Woessner, P.A.

(57) ABSTRACT

An arm assembly with an arm locking system is described. The arm assembly can include a base to position the arm on a support structure, an extension arm, a height adjustable lift arm, and a head assembly adapted to receive an electronic display. The extension arm can be rotatably coupled to the base at a first joint, the lift arm can be rotatably coupled to the extension arm at a second joint, and the head assembly can be rotatably coupled to the lift arm at a third joint. The arm locking system can include a first lock, a second lock, and a third lock engageable to selectively prevent movement about the first joint, the second joint, and the third joint, respectively. The arm locking system can also include a fourth lock engageable to selectively prevent the height adjustment of the lift arm.

20 Claims, 9 Drawing Sheets

(56)                  References Cited

U.S. PATENT DOCUMENTS

| 9,055,910 | B2 | | 6/2015 | Nakajima |
| 9,266,243 | B2 | * | 2/2016 | Swartz ................. F16M 13/022 |
| 10,400,946 | B2 | * | 9/2019 | Bennett .................. A47B 81/00 |
| 11,131,423 | B2 | | 9/2021 | Anderson et al. |
| 2004/0068185 | A1 | | 4/2004 | Marshall et al. |
| 2008/0228071 | A1 | | 9/2008 | Mesaros |
| 2008/0234577 | A1 | | 9/2008 | Murkowski et al. |
| 2010/0274137 | A1 | | 10/2010 | Shim |
| 2011/0201927 | A1 | | 8/2011 | Hayakawa et al. |
| 2012/0182709 | A1 | | 7/2012 | Asai et al. |
| 2015/0342562 | A1 | | 12/2015 | Messina et al. |
| 2019/0086022 | A1 | | 3/2019 | Anderson et al. |

FOREIGN PATENT DOCUMENTS

| EP | 3426965 | B1 | 4/2021 |
| WO | WO-2013155180 | A1 | 10/2013 |

* cited by examiner

INTEGRATED LOCK MECHANISM FOR AN ARTICULATING ARM

CLAIM OF PRIORITY

This patent application claims the benefit of priority of Lunde, et al., U.S. Provisional Patent Application Ser. No. 63/385,892, entitled "INTEGRATED LOCK MECHANISM FOR AN ARTICULATING ARM," filed on Dec. 2, 2022, which is hereby incorporated by reference herein in its entirety.

TECHNICAL FIELD

This document pertains generally, but not by way of limitation, to systems and methods for mounting electronic devices.

BACKGROUND

This disclosure is related to an articulating arm assembly to mount one or more electronic displays to a structure. Examples of the invention include an arm assembly with an arm locking system. In some examples, the arm locking system is operable to selectively lock one or more joints of the arm assembly. Such an arm locking system is useful for restricting movement of an electronic device attached to the arm assembly about selected axes. Examples of the invention also include methods of using arm assemblies with arm locking systems.

BRIEF DESCRIPTION OF THE DRAWINGS

Various examples are illustrated in the figures of the accompanying drawings. Such examples are demonstrative and not intended to be exhaustive or exclusive examples of the present subject matter.

The following drawings are illustrative of particular embodiments of the present invention and therefore do not limit the scope of the invention. The drawings are not to scale and are intended for use in conjunction with the explanations in the following detailed description. Like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This disclosure is directed to an articulating arm assembly to mount one or more electronic displays to a structure. The structure can include, but not limited to, a mobile workstation, a desk, a wall, or the like. The arm assembly can move the one or more displays along a range of travel relative to the structure.

The arm assembly can include a base, one or more arms and a pan bracket. The base can be coupled to the structure. In some example configurations, the one or more arms can include an extension arm and a lift arm. The extension arm can be rotatably coupled to the base, the lift arm can be rotatably coupled to the extension arm, and the pan bracket can be rotatably coupled to the lift arm. The arm assembly can include an internal locking mechanism. The internal lock mechanism can be used to selectively activate (e.g., enable the rotation or the height adjustment) or deactivate (e.g., immobilize the rotation or the height adjustment) the relative motion between components of the arm assembly either to change a position of the one or more displays, or to maintain the position of the one or more displays, respectively.

The above discussion is intended to provide an overview of subject matter of the present patent application. It is not intended to provide an exclusive or exhaustive explanation of the invention. The description below is included to provide further information about the present patent application.

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
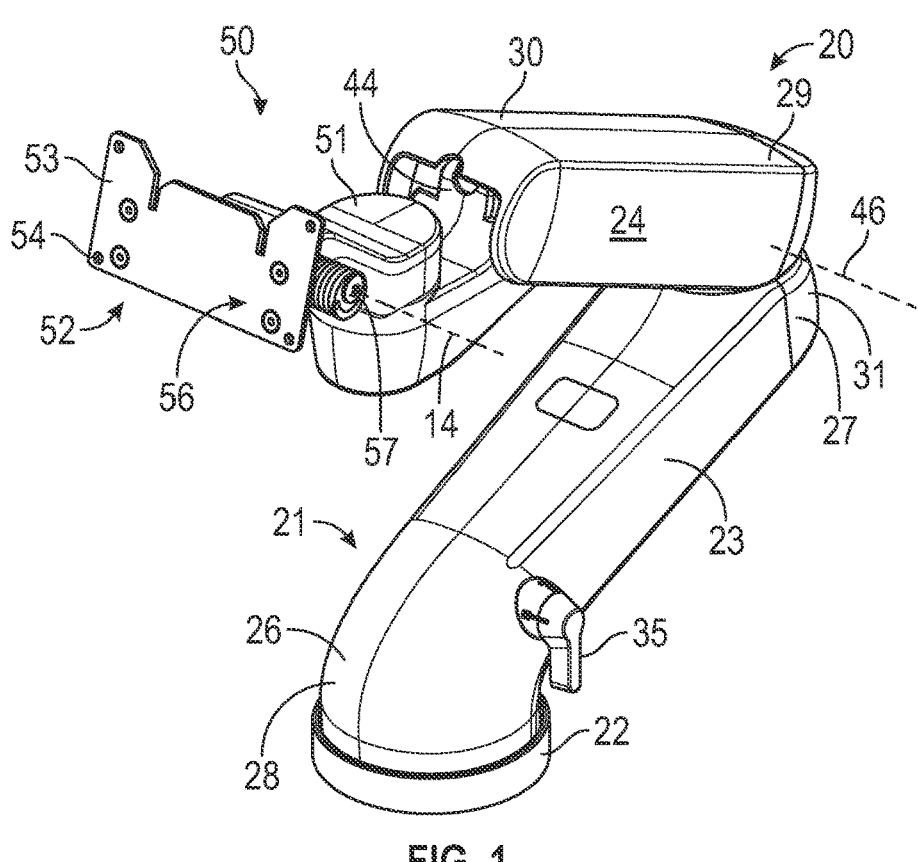
FIG. 1 is a perspective view of an arm assembly according to an example configuration of the current disclosure.
Figure 2:
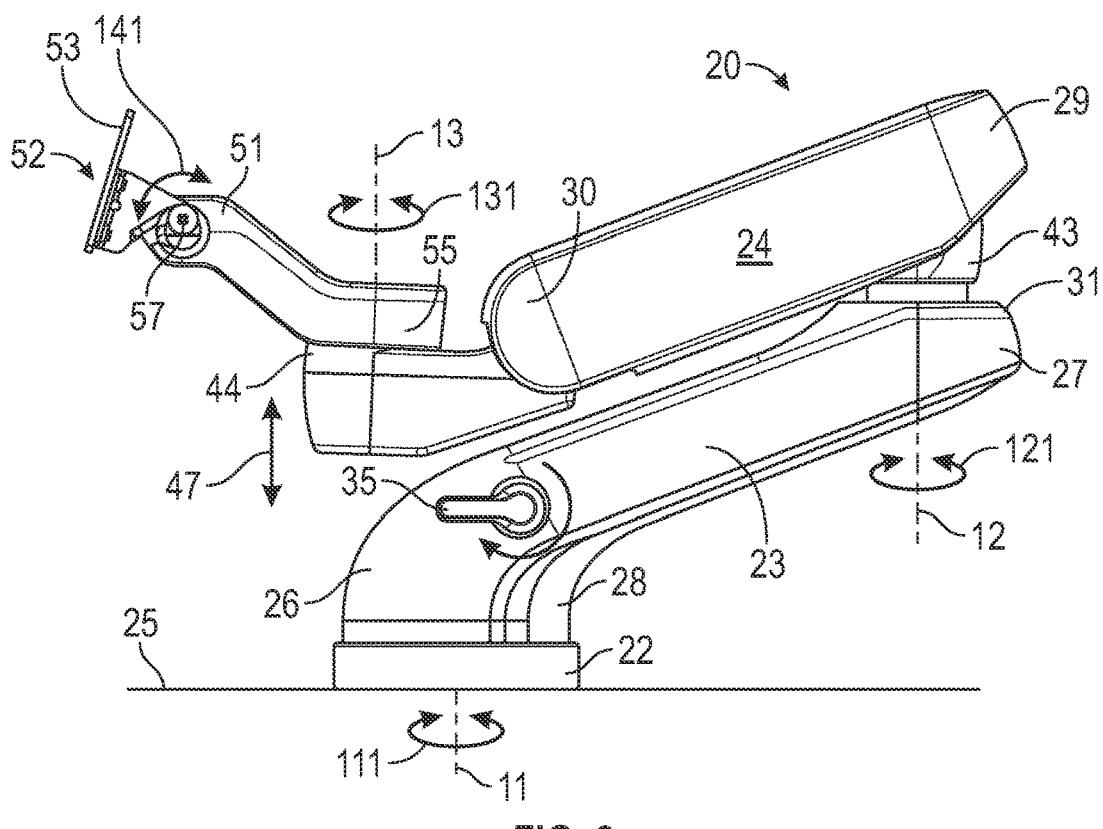
FIG. 2 is a side view of the arm assembly of FIG. 1.

FIGS. 1-2 are perspective and side views of an arm assembly 20, respectively, according to some example configurations of the current disclosure. The arm assembly 20 can be used to position an electronic device, such as a flat panel display (shown in FIGS. 19-21) or tablet, at a desired position about one or more of axes. In some example configurations, the arm assembly 20 can include an arm locking system 21. operatively coupled to an actuator 35. The actuator 35 (e.g., a handle, a knob, or the like) can be manipulated (e.g., pushed, pulled, rotated, or the like) by a user for selectively locking the position of the arm assembly 20 about one, some, or all of the one or more of axes.

In some example configurations, the arm assembly 20 can include a base 22, an extension arm 23, and a lift arm 24. The base 22 can be fixedly attached to a support structure 25 (shown in FIG. 2) to position the arm assembly 20 on the support structure 25. The support structure 25 can be a mobile workstation (e.g., the cart 220 of FIG. 19), a tabletop (e.g., the work surface 231 of FIG. 20), a wall mount (e.g., the wall plate 240 of FIG. 21), or any structure with sufficient stability to support the arm assembly 20. In some example configurations, the base 22 can be built as part of the support structure 25.

The extension arm 23 can have a first portion 26 proximate to the base 22 and a second portion 27 opposite to and away from the first portion 26. The extension arm 23 can be rotatably coupled to the base 22 at a first joint 28 proximate the first portion 26. In some example configurations, the first joint 28 can be between the first portion 26 of the extension arm 23 and the base 22. In other example configurations, the first joint 28 can be between the extension arm 23 and the support structure 25.

As shown in FIGS. 1-2, the lift arm can include a third portion 29 and a fourth portion 30. The lift arm 24 can be rotatably coupled to the extension arm 23 at a second joint 31 proximate to the third portion 29. The second joint 31 can be between the lift arm 24 proximate to the third portion 29 and the extension arm 23 proximate to the second portion 27.

The arm assembly 20 can include a single arm, double articulating arm, and/or any combination of extension and lift arms. In examples shown in FIGS. 1-2, the arm assembly 20 can include an extension arm 23 and a lift arm 24. The extension arm 23 can be rotatably coupled to the support structure 25 or base 22 at a first joint 28. The first joint 28 can enable a first rotational movement 111 between the extension arm 23 and the base 22 about a first axis 11. The first axis 11 can be generally in a vertical orientation. The first joint 28 can permit a 360-degree rotation of the extension arm 23 about the first axis 11. As shown in FIGS. 1-2, the extension arm 23 can rise from the base 22 as it extends. In other example configurations, the extension arm 23 can have a fixed height relative to the base 22, such that the second portion 27 of the extension arm 23 can be at the same height as the first portion 26 of the extension arm 23.

The lift arm 24 can be rotatably coupled to the extension arm at a second joint 31 proximate to the third portion 29. The second joint 31 can enable a second rotational movement 121 between the lift arm 24 and the extension arm 23 about a second axis 12. The second axis 12 can be generally in a vertical orientation. The second joint 31 can permit a 360-degree rotation of the lift arm 24 about the second axis 12. The fourth portion 30 can be height adjustable relative to the third portion 29.

In some example configurations, the arm assembly 20 can also include a head assembly 50. The head assembly 50 can include a pan bracket 51 and a tilt assembly 52. The head assembly 50 can be rotatably coupled to the fourth portion 30 of the lift arm 24. The tilt assembly 52 can include an interface plate 53 having a hole pattern 54. The interface plate 53 and the hole pattern 54 can be adapted to receive an electronic display. The interface plate 53 can be rotatably coupled to the pan bracket 51 about generally a horizontal axis (e.g., a fourth axis 14 of FIG. 1).

The pan bracket 51 can rotate with respect to the fourth portion 30 of the lift arm 24 at a third joint 55. The third joint 55 can enable a third rotational movement 131 between the minor bracket 44 and the pan bracket 51 about a third axis 13. The third axis 13 can be generally in a vertical direction. An electronic display coupled to the interface plate 53 can rotate about the third axis 13 relative to the support structure 25.

Also as shown in FIG. 1, in some example configurations, a tilt mechanism 56 can be coupled between the interface plate 53 and the pan bracket 51. The tilt mechanism 56 can control the rotation of the interface plate 53 relative to the pan bracket 51 about a tilt hinge 57. The tilt hinge 57 can define the fourth axis 14, which can be generally horizontal. The tilt mechanism 56 can enable a fourth rotational movement 141 (e.g., a tilt) of an electronic display coupled to the interface plate 53 about the fourth axis 14 relative to the support structure 25.

The arm locking system 21 can include any structure to lock the position (e.g., rotational position) of the extension arm 23 with respect to the support structure 25 and/or base 22, lock the position (e.g., rotational position) of the lift arm 24 with respect to the extension arm 23, lock the position (e.g., adjustable height position) of the fourth portion 30 of the lift arm 24 with respect to the extension arm 23 and/or base 22, and lock the position (e.g., rotational position) of the head assembly 50 with respect to the lift arm 24.

Figures 3, 4:
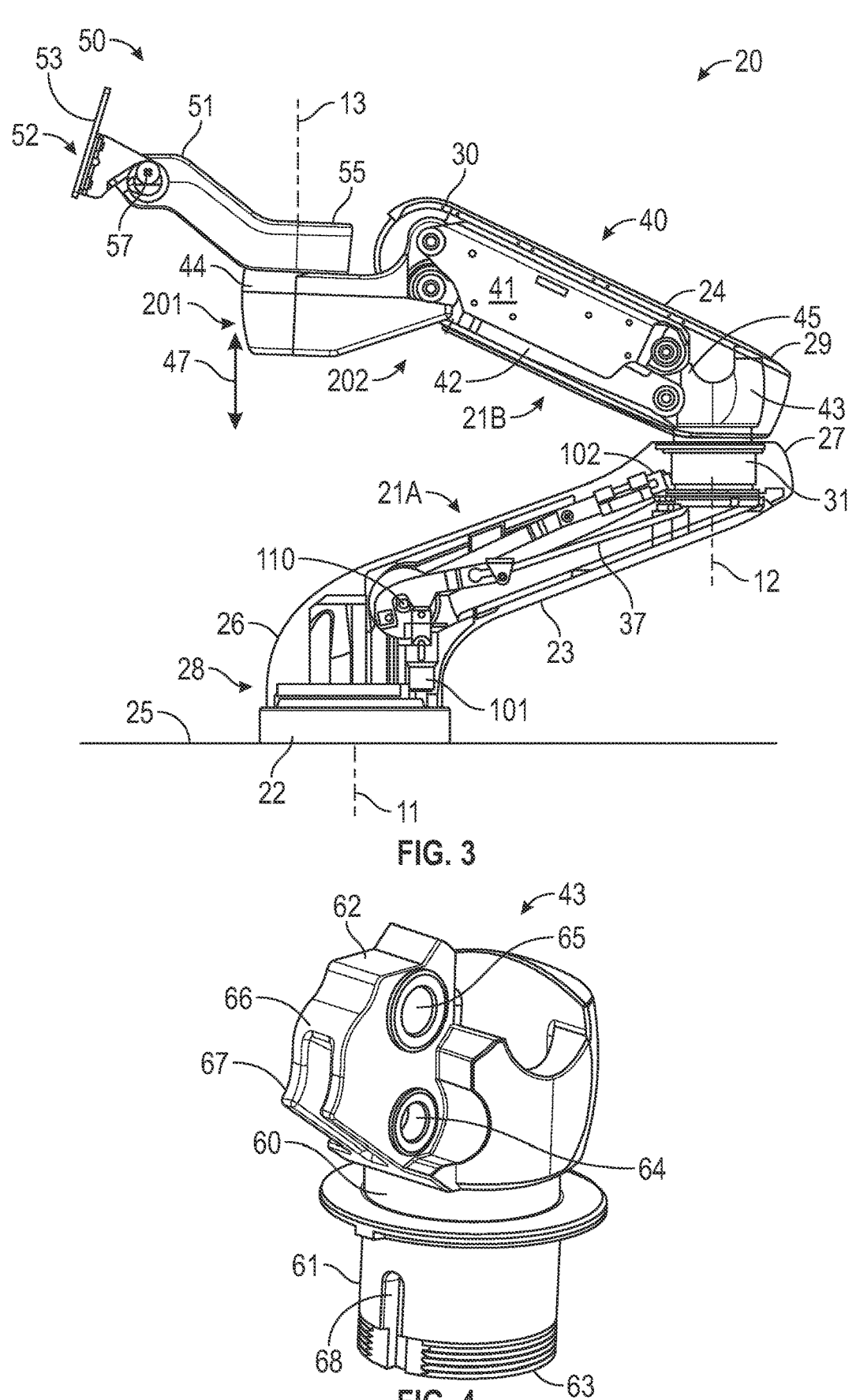
FIG. 3 is a side view of the arm assembly of FIG. 1 including the extension arm and the lift arm with four-bar linkage.
FIG. 4 is a perspective view of the major bracket of the four-bar linkage of FIG. 3.

FIG. 3 is a side view of the arm assembly 20 of FIG. 1 according to an example configuration of the current disclosure. Portions of the extension arm 23 and lift arm 24 are rendered transparent for clarity. The lift arm 24 can include any structure that can allow for height adjustment of at least the fourth portion 30 of the lift arm 24 with respect to the third portion 29. In some example configurations, the lift arm 24 can include a four-bar linkage 40. The four-bar linkage 40 can include a first link arm 41, a second link arm 42, a major bracket 43 and a minor bracket 44. The first link arm 41 and the second link arm 42 can cooperate to enable the lift arm 24 to pivot about an axis 46 of a lift joint 45 to translate the minor bracket 44 relative to the base 22 along a lift range 47. The axis 46 can be generally horizontal.

Figure 8:
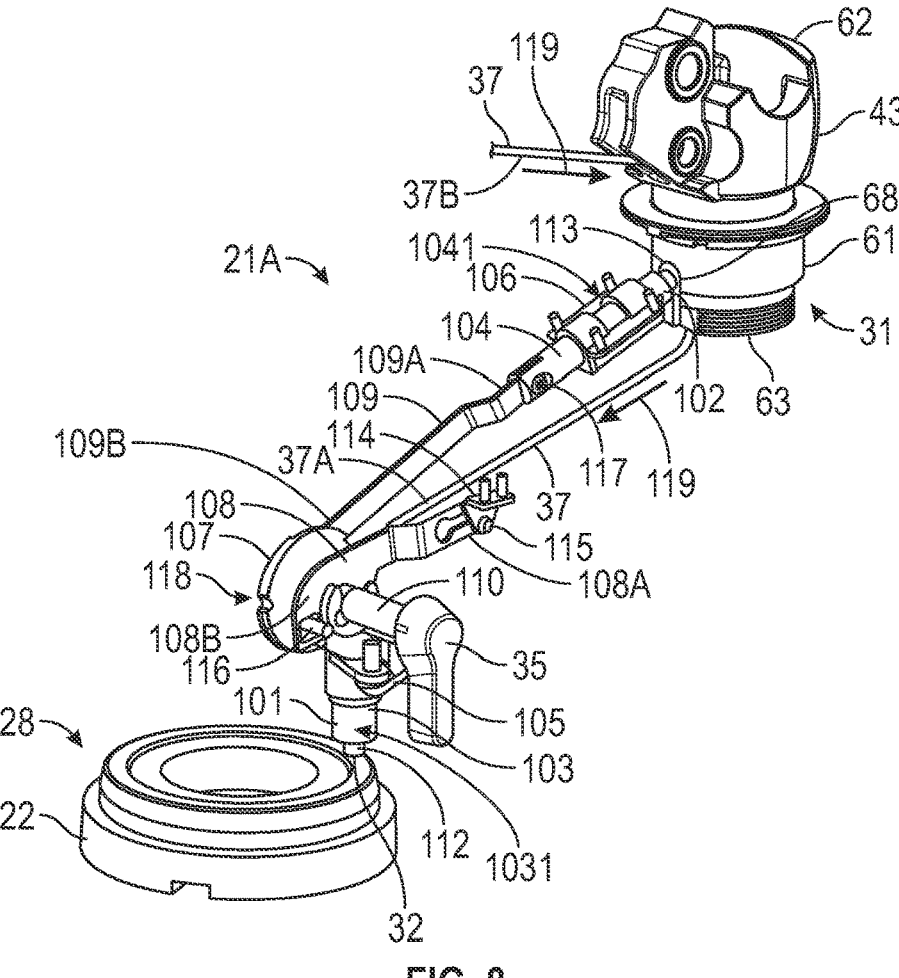
FIG. 8 is a perspective view of the first lock assembly of FIG. 3 according to an example configuration of the current disclosure.

In some example configurations the arm locking system 21 can include a first lock assembly 21A and a second lock assembly 21B. The first lock assembly 21A can be coupled to the extension arm 23. The first lock assembly 21A can include a first lock 101 and a second lock 102, as shown in FIG. 8. The second lock assembly 21B can be coupled to the second link arm 42. The second lock assembly 21B can include a third lock 201 and a fourth lock 202, as shown in FIG. 3. The first lock assembly 21A and the second lock assembly 21B can be operatively coupled to each other via a cable 37 (shown in FIGS. 8-9) to form the arm locking system 21. The first lock assembly 21A can be used for locking a movement in the first joint 28 (e.g., by activating the first lock 101) and for locking a movement in the second joint 31 (e.g., by activating the second lock 102), and the second lock assembly 21B can be used for locking a movement in the third joint 55 (e.g., by activating the third lock 201) and for locking the height adjustment of the lift arm 24 (e.g., by activating the fourth lock 202)

FIG. 4 is a perspective view of the major bracket 43 of FIG. 3. The major bracket 43 can have a hollow body 60 including a first portion 61 and a second portion 62. The hollow body 60 can have an opening 63 extending from the first portion 61 to the second portion 62. The hollow body 60 can have a round outside cross-section proximate the first portion 61. A first opening 64 and a second opening 65 can be formed on the major bracket 43 proximate the second portion 62. The major bracket 43 can also include a cam 66 having a cam profile 67 formed on an outside surface of the hollow body 60 proximate the second portion 62. One or more of the first slot 68 can be formed on the major bracket 43 proximate the first portion 61.

Figure 5:
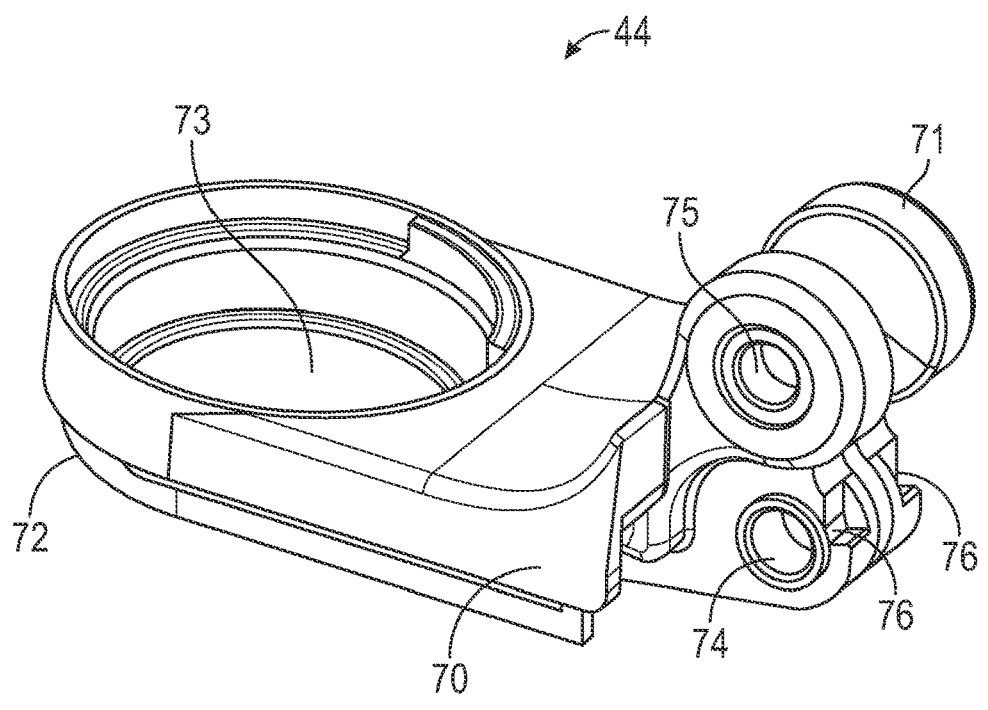
FIG. 5 s a perspective view of the minor bracket of the four-bar linkage of FIG. 3.

FIG. 5 is a perspective view of the minor bracket 44 of FIG. 3. The minor bracket 44 can have a body 70 extending from a first portion 71 to a second portion 72. An aperture 73 can be formed on the body 70 proximate the second portion 72. The aperture 73 can have a round cross-section. A third opening 74 and a fourth opening 75 can be formed on the minor bracket 44 proximate the first portion 71. The minor bracket 44 can also include one or more notches 76 formed on the minor bracket 44 proximate the first portion 71.

Figure 6:
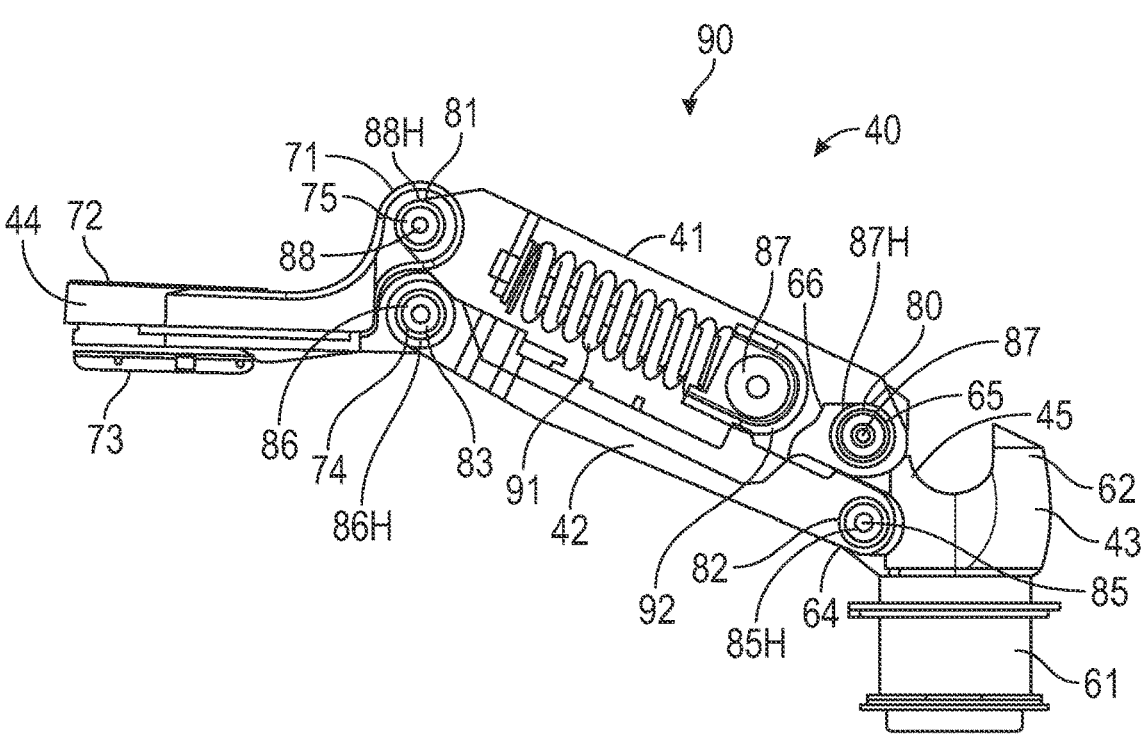
FIG. 6 a side view of the four-bar linkage of FIG. 3.

FIG. 6 is a side view of the four-bar linkage 40 of FIG. 3. The four-bar linkage 40 can include a first link arm 41, a second link arm 42, a major bracket 43, and a minor bracket 44. The first link arm 41 can have a fifth opening 80 and a sixth opening 81 away from the fifth opening 80, and the second link arm 42 can have a seventh opening 82 and an eighth opening 83 away from the seventh opening 82. A distance between the fifth opening 80 and the sixth opening 81 can be equal to a distance between the seventh opening 82 and the eighth opening 83.

The fifth opening 80 can be concentric with the second opening 65 of the major bracket 43 and the sixth opening 81 can be concentric with the fourth opening 75 of the minor bracket 44. The seventh opening 82 can be concentric with the first opening 64 of the major bracket 43 and the eighth opening 83 can be concentric with the third opening 74 of the minor bracket 44.

A first mechanical fastener 85 can be inserted through the first opening 64 of the major bracket 43 and the seventh opening 82 of the second link arm 42 to form a first hinge 85H. A second mechanical fastener 86 can be inserted through the third opening 74 of the minor bracket 44 and the eighth opening 83 of the second link arm 42 to form a second hinge 86H. The second link arm 42 can be rotatable coupled to the major bracket 43 about the first hinge 85H and rotatably coupled to the minor bracket 44 about the second hinge 86H.

A third mechanical fastener 87 can be inserted through the second opening 65 of the major bracket 43 and the fifth opening 80 of the first link arm 41 to form a third hinge 87H. A fourth mechanical fastener 88 can be inserted through the fourth opening 75 of the minor bracket 44 and the sixth opening 81 of the first link arm 41 to form a fourth hinge 88H. The first link arm 41 can be rotatable coupled to the major bracket 43 about the third hinge 87H and rotatably coupled to the minor bracket 44 about the fourth hinge 88H. The first link arm 41 and the second link arm 42 can be parallel to each other while they pivot about the generally horizontal axis 46 of the lift joint 45 to maintain an angular orientation of the minor bracket 44 relative to the major bracket 43 while translating the minor bracket 44 relative to the major bracket 43 along the lift range 47.

In some example configurations, the four-bar linkage 40 can include a counterbalance mechanism 90. The counterbalance mechanism 90 can include a compression spring 91 contained inside the first link arm 41. The compression spring 91 can be coupled to the first link arm 41 proximate one section and coupled to a cam follower 92 proximate the other section. The cam follower 92 can be in contact with the cam 66 and move over the cam profile 67 as the lift arm 24 pivots about the generally horizontal axis 46 of the lift joint 45.

Figure 7:
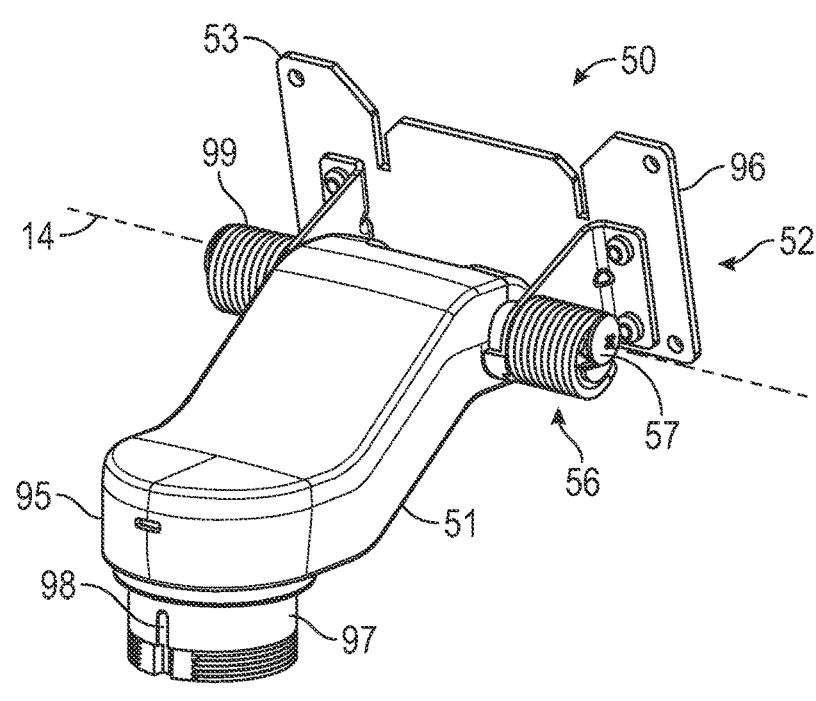
FIG. 7 is a perspective view of the head assembly of FIG. 1.

FIG. 7 is a perspective view of the head assembly 50 of FIG. 1. The head assembly 50 can have a fifth portion 95 and a sixth portion 96. The head assembly 50 can include a pan bracket 51 and a tilt assembly 52. The pan bracket 51 can extend from the fifth portion 95 towards the sixth portion 96 of the head assembly 50. A protrusion 97 can extend from the pan bracket 51 in a transverse direction proximate the fifth portion 95. The protrusion 97 can have a circular cross-section. The aperture 73 of the minor bracket 44 can be adapted to receive the protrusion 97 to form the third joint 55 (shown in FIG. 1). One or more second slots 98 can be formed on the protrusion 97.

The tilt assembly 52 can include an interface bracket 53 and a tilt mechanism 56. The interface bracket 53 can be adapted to receive an electronic display. The interface bracket 53 can be rotatably coupled to the pan bracket 51 at a tilt hinge 57 proximate the sixth portion 96 of the head assembly 50. The tilt assembly 52 can be configured to rotate the electronic display coupled to the interface bracket 53 about the fourth axis 14 formed by the tilt hinge 57.

The tilt mechanism 56 can include one or more torsion springs 99. The one or more torsion springs 99 can be coupled between the pan bracket 51 and the interface bracket 53. The one or more torsion springs 99 can be configured to counterbalance at least a portion of the weight of the electronic display coupled to the interface bracket 53 during the fourth rotational movement 141 about the fourth axis 14.

FIG. 8 is a perspective view of the first lock assembly 21A of FIG. 3. The first lock assembly 21A can be coupled to the extension arm 23. The extension arm 23 is rendered transparent for clarity. In some example configurations, the first lock assembly 21A can have a first lock 101 selectively engageable with the base 22 to prevent movement about the first joint 28, and a second lock 102 selectively engageable to prevent movement about the second joint 31. In some example configurations, a user can actuate the first lock 101 and the second lock 102 at the same time, such as by actuating a single of the actuator 35. After actuation, the first lock 101 and the second lock 102 are primed to lock (e.g., put in a ready-to-lock state). The user can then independently engage one, or both locks to complete the locking function of each lock independently, as described further below.

In some example configurations, the first lock assembly 21A can include a first engagement member 103 and a second engagement member 104. The first engagement member 103 and the second engagement member 104 can be coupled to the extension arm 23 via a first bracket 105 and a second bracket 106, respectively. The first engagement member 103 and the second engagement member 104 can be operatively coupled to the actuator 35, and they can be actuated by the actuator 35 to perform the locking operation in the first lock 101 and the second lock 102, respectively.

The first lock assembly 21A can also include a pivot member 107, a first arm 108 and a second arm 109. The actuator 35 can be coupled to the pivot member 107. The first engagement member 103 can be operatively coupled to the pivot member 107 via the first arm 108, and the second engagement member 104 can be operatively coupled to the pivot member 107 via the second arm 109. The actuator 35 can be used to rotate the pivot member 107 about a first pivot point 110 to actuate the first engagement member 103 and the second engagement member 104.

In some example configurations, the first engagement member 103 of the first lock 101 can include a first pin 112 adapted to be received within a pin receiving aperture 32 located in the base 22 or support structure 25 (e.g., to form the first lock 101). The second engagement member 104 of the second lock 102 can include a second pin 113 adapted to be received within a first slot 68 formed on the first portion 61 of the major bracket 43 (e.g., to form the second lock 102). The base 22 can include more than one pin receiving aperture 32 and the major bracket 43 can include more than one of the first slot 68 such that the extension arm 23 and/or the lift arm 24 can be locked in more than one position.

In some example configurations, the first engagement member 103 and the second engagement member 104 can include a biasing element (e.g., a first biasing element 1031 and a second biassing element 1041, respectively). The biassing element can be a spring including, but not limited to, a compression spring, extension spring, a torsion spring, or the like. When either the first joint 28 or the second joint 31 is rotated to a position where the ready-to lock engagement member is inline with the pin receiving aperture 32 or the first slot 68, the lock biasing elements (1301, 1401) can push the first pin 112, or the second pin 113 into the pin receiving aperture 32 or the first slot 68 to lock the first joint 28 or the second joint 31, respectively.

The first lock assembly 21A can also include a third bracket 114. The third bracket 114 can be coupled to the extension arm 23. The first arm 108 can be elongated between a first portion 108A and a second portion 108B. The first arm 108 can be rotatably coupled to the third bracket 114 at a second pivot point 115 proximate the first portion 108A and engaged with a protrusion 116 located on the pivot member 107 proximate the second portion 108B. The first arm 108 can be coupled to the first engagement member 103 between the first portion 108A and the second portion 108B.

The actuator 35 is shown in a locked orientation in FIG. 8. In the locked orientation of the actuator 35, the first pin 112 can be at least partially located inside the pin receiving aperture 32 putting the first joint 28 in a locked configuration. In the locked configuration of the first joint 28, the extension arm 23 cannot rotate relative to the base 22 or the support structure 25. When the actuator 35 is rotated in a clockwise direction about the first pivot point 110, the actuator 35 can also rotate the pivot member 107 in the clockwise direction. The protrusion 116 can rotate together with the pivot member 107 about the first pivot point 110 causing the first arm 108 to rotate about the second pivot point 115, and thus, moving the first pin 112 away from the pin receiving aperture 32. When the first pin 112 disengages from the pin receiving aperture 32, the first joint 28 can be placed in an unlocked configuration. In the unlocked configuration of the first joint 28, the extension arm 23 can rotate about the first axis 11 relative to the base 22 or the support structure 25.

The second arm 109 can be elongated between a first portion 109A and a second portion 109B. The second arm 109 can be rotatably coupled to the second engagement member 104 at a third pivot point 117 proximate the first portion 109A, and rotatably coupled to the pivot member 107 at a fourth pivot point 118 proximate the second portion 109B.

The second joint 31 is shown in a locked configuration in FIG. 8 where the second pin 113 of the second lock 102 can be at least partially located inside the first slot 68. When the actuator 35 is rotated in a clockwise direction about the first pivot point 110, the actuator 35 can also rotate the pivot member 107 in the clockwise direction. The fourth pivot point 118 can rotate together with the pivot member causing the second arm 109 pull away from the second lock causing the second pin move away from the first slot 68. When the second pin 113 disengages from the first slot 68, the second joint 31 can be placed in an unlocked configuration. In the unlocked configuration of the second joint 31, the lift arm 24 can rotate about the second axis 12 relative to the extension arm 23.

In some example configurations, the arm locking system 21 can also include a cable 37. The cable 37 can be elongated from a first portion 37A to a second portion 37B. The cable 37 can be made from a flexible material including, but not limited to, steel wire, non-metallic tensile polymer rope, or the like. The cable 37 can be coupled to the pivot member 107 of the first lock assembly 21A proximate the first portion 37A and coupled to the second lock assembly 21B (e.g., coupled to a sled 150 shown in FIG. 9) proximate the second portion 37B. The cable 37 can be routed through the opening 63 of the major bracket 43 between the first portion 37A and the second portion 37B. The cable 37 can be pulled in a first direction 119 when the actuator 35 is rotated in clockwise direction to put the second lock assembly 21B in an unlocked configuration as discussed in the following sections.

Figures 9, 10, 11, 12:
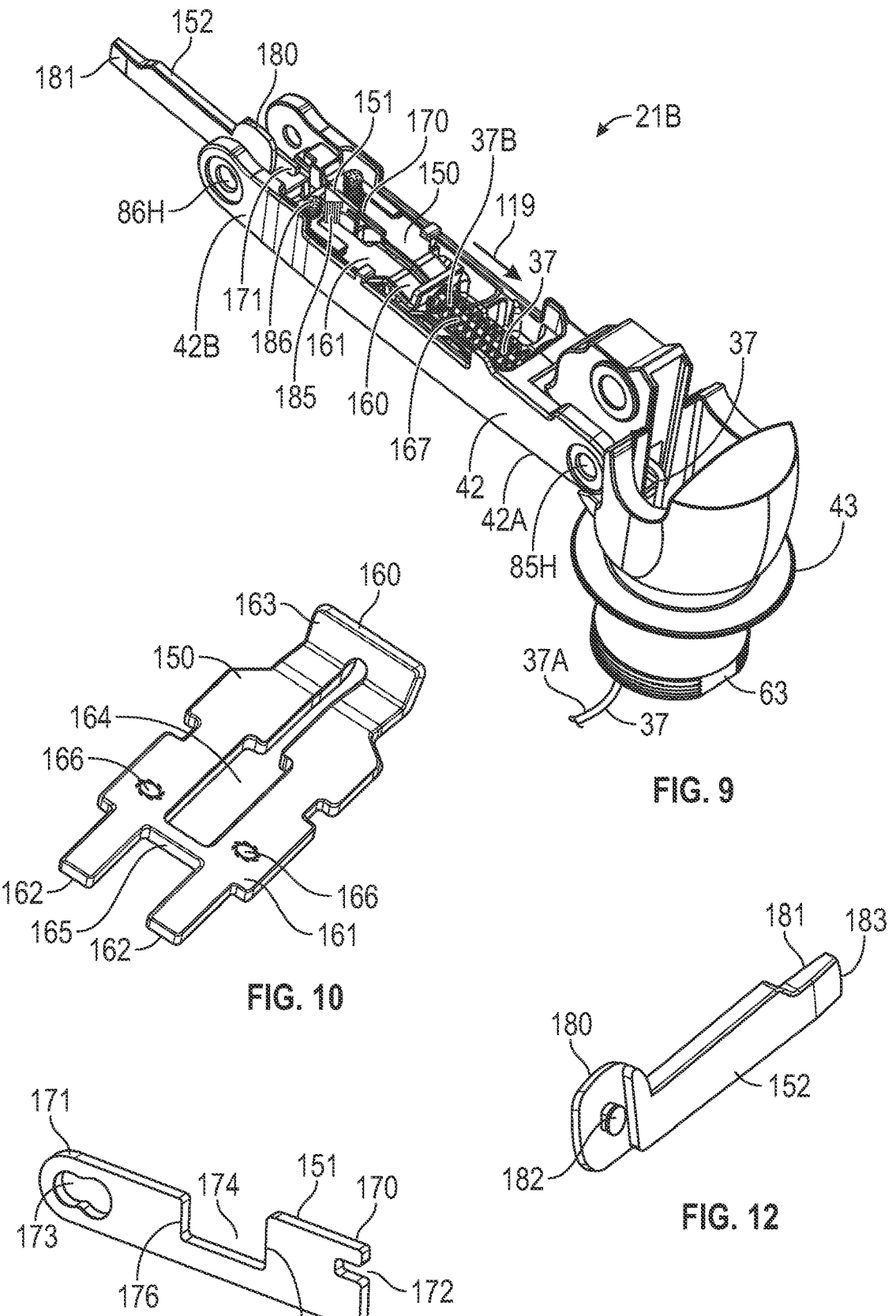
FIG. 9 is a perspective view of the second lock assembly of FIG. 3 according to an example configuration of the current disclosure.
FIG. 10 is a perspective view of a sled of the second lock assembly of FIG. 9.
FIG. 11 is a perspective view of a brace of the second lock assembly of FIG. 9.
FIG. 12 is a perspective view of the key of the second lock assembly of FIG. 9.

FIG. 9 is a perspective view of the second lock assembly 21B according to an example configuration of the current disclosure. The second lock assembly 21B can be coupled to the second link arm 42 having a first portion 42A and a second portion 42B. The second lock assembly 21B can include a sled 150, a brace 151 and a key 152. The sled 150 can be slidably engaged with the second link arm 42, and the brace 151 can be slidingly engaged with the sled 150. The sled 150 and the brace 151 can be contained inside the second link arm 42, and they can be located proximate the second portion 42B of the second link arm 42. The key 152 can be slidingly engaged with the minor bracket 44. The key 152 can be at least partially located inside the second portion 42B of the second link arm 42, and the key 152 can be rotatably coupled to the brace 151.

The second lock assembly 21B can be operatively coupled to the first lock assembly 21A and the actuator 35 via the cable 37. The cable 37 can have a first portion 37A and a second portion 37B. The first portion 37A can be coupled to the pivot member 107 as discussed in previous sections. The cable 37 can be routed through the opening 63 of the major bracket 43, and the second portion 37B of the cable 37 can be coupled to the sled 150. The cable 37 can be flexible to accommodate for the second rotational movement 121 of the lift arm 24 relative to the extension arm 23 without translating the sled 150 and unintentionally activating the arm locking system 21.

FIG. 10 is a perspective view of the sled 150 of FIG. 9 according to an example configuration of the current disclosure. The sled 150 can be built in a planar construction extending between a first sled portion 160 and a second sled portion 161. The second link arm 42 can be adapted to receive the sled 150. The sled 150 can be slidably engaged with the second link arm 42.

Figures 13, 14, 15, 16:
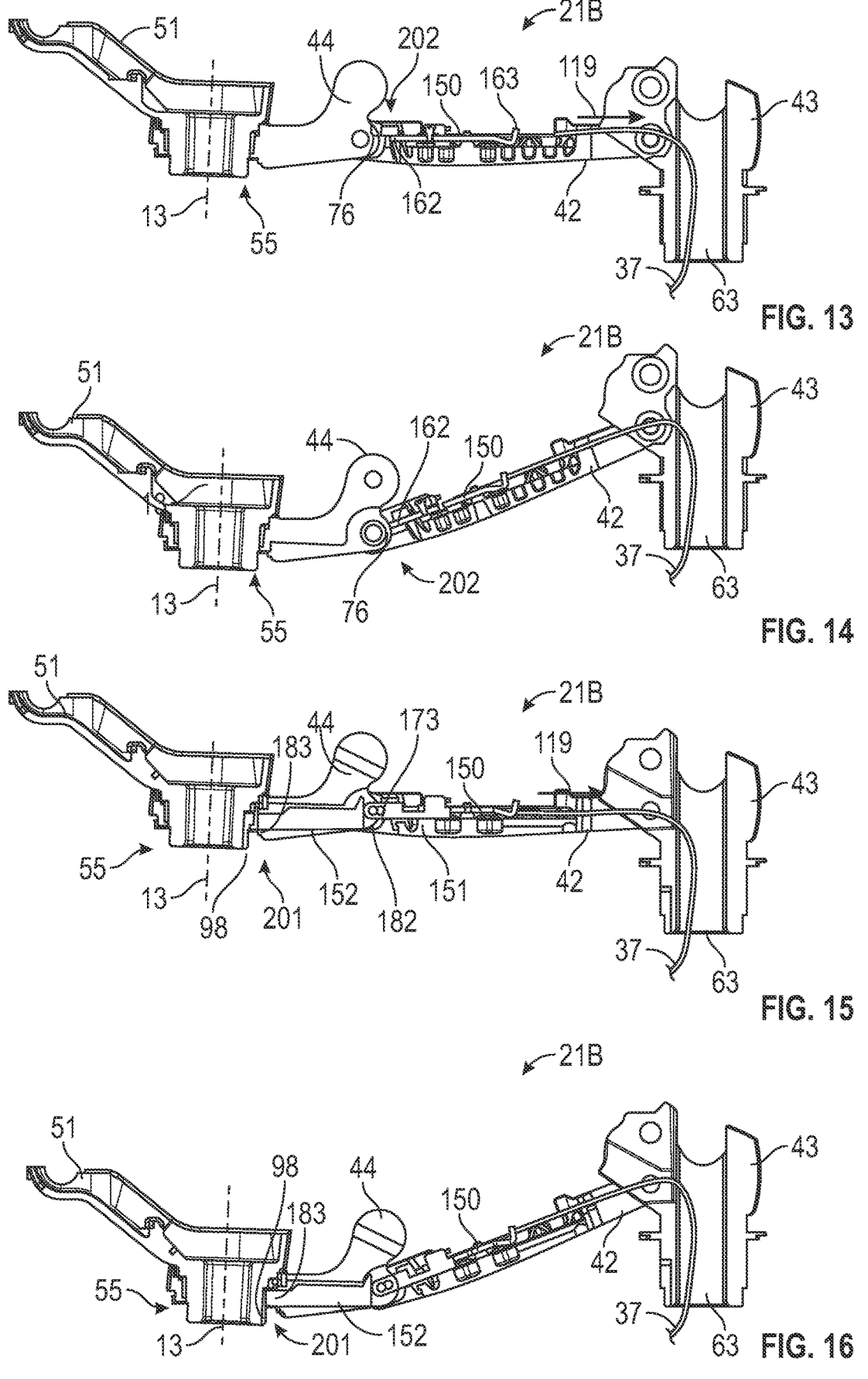
FIG. 13 is a partial side view of the second lock assembly of FIG. 9 in an unlocked configuration.
FIG. 14 is a partial side view of the second lock assembly of FIG. 9 in a locked configuration.
FIG. 15 is a partial side view of the second lock assembly of FIG. 9 in an unlocked configuration.
FIG. 16 is a partial side view of the second lock assembly of FIG. 9 in a locked configuration.

One or more pawls 162 can be formed on the sled 150 proximate the second sled portion 161 and a tab 163 can be formed proximate the first sled portion 160. In some example configurations one or more notches 76 of the minor bracket 44 (shown in FIG. 5) can be adapted to receive the one or more pawls 162 in a locked configuration (e.g., to form the fourth lock 202 for locking the height adjustment of the lift arm 24, as shown in FIG. 14). An elongated slot 164 can be formed on the sled 150. The elongated slot 164 can extend from the tab 163 proximate the first sled portion 160 towards the second sled portion 161. A bridge 165 can be formed on the sled 150 proximate the second sled portion 161. The sled 150 can also include one or more apertures 166 (e.g., round holes, or the like). In some example configurations, the one or more apertures 166 can be threaded.

The second lock assembly 21B can also include a sled spring 167 as illustrated in FIG. 9. In an example configuration, the sled spring 167 can be a compression spring. The sled spring 167 can be coupled between the tab 163 located proximate the first sled portion 160 and the first portion 42A of the second link arm 42. The sled spring 167 can bias the sled 150 towards the second portion 42B of the second link arm 42. The second portion 37B of the cable 37 can be coupled to the sled 150 proximate the first sled portion 160. In an example configuration, the second portion 37B of the cable 37 can be located inside the sled spring 167. When the actuator 35 is rotated in a clockwise direction to put the arm locking system 21 in an unlocked configuration, as illustrated in FIG. 2, the cable 37 can be adapted to be pulled in the first direction 119 causing the sled 150 to translate towards the first portion 42A of the second link arm 42 by compressing the sled spring 167.

FIG. 11 is a perspective view of the brace 151 of FIG. 9 according to an example configuration of the current disclosure. The brace 151 can extend from a first brace portion 170 to a second brace portion 171. A dimple 172 can be formed proximate the first brace portion 170 and an aperture 173 can be formed proximate the second brace portion 171. A cavity 174 can be formed on the brace 151 between the first brace portion 170 and the second brace portion 171. The cavity 174 can have a first end 175 and a second end 176. The cavity 174 can be adapted to receive the bridge 165 of the sled 150. The brace 151 can be at least partially located inside the elongated slot 164 of the sled 150. The brace 151 can be slidably engaged with the sled 150.

FIG. 12 is a perspective view of the key 152 of FIG. 9 according to an example configuration of the current disclosure. The key 152 can be elongated from a first key portion 180 to a second key portion 181. A stud 182 can be formed on the key 152 proximate the first key portion 180. The stud 182 can extend from the key 152 in a transverse direction. The key 152 can also include a tip 183 proximate the second key portion 181.

The aperture 173 of the brace 151 can be adapted to receive the stud 182 to operably couple the key 152 to the brace 151. The key 152 can be slidably engaged with the minor bracket 44. In some example configurations, the second slot 98 of pan bracket 51 (shown in FIG. 7) can be adapted to receive the tip 183 in a locked configuration (e.g., to form the third lock 201 for locking the third joint 55, as shown in FIG. 16). The key 152 can be tapered proximate the tip 183 to enable the key 152 easily penetrate the second slot 98 in the locked configuration.

In some example configurations, the second lock assembly 21B can include one or more brace springs 185, as shown in FIG. 9. The one or more brace springs 185 can be an extension spring, a torsion spring, a compression spring, or the like. The one or more brace springs 185 can be coupled between the sled 150 (e.g., coupled to the sled 150 via one or more fasteners 186 engaged with the one or more apertures 166) and the brace 151 (e.g., coupled to the dimple 172 of the brace 151). The one or more brace springs 185 can bias the first end 175 of the cavity 174 on the brace 151 towards the bridge 165 of the sled 150.

FIGS. 13-14 are partial side views of the second lock assembly 21B including the fourth lock 202 in an unlocked configuration and in a locked configuration, respectively. The actuator 35 can be rotated in a clockwise direction to put the arm locking system 21 in an unlocked configuration, as shown in FIG. 2. In the unlocked configuration, the pivot member 107 can also rotate together with the actuator 35 to pull the cable 37 in a first direction 119 and put the second lock assembly 21B in an unlocked configuration, as shown in FIG. 13. The cable 37 can pull the sled 150 away from the minor bracket 44 (e.g., the sled 150 can move away from the second portion 42B towards the first portion 42A of the second link arm 42) causing the one or more pawls 162 disengage from the one or more notches 76 located on the minor bracket 44 in the unlocked configuration, as shown in FIG. 13. Disengaging the one or more pawls 162 from the one or more notches 76 can enable the lift arm 24 to change an elevation of the minor bracket 44 relative to the major bracket 43.

When the actuator 35 rotates in a counterclockwise direction to put the arm locking system 21 in a locked configuration, as show in FIG. 1, the pivot member 107 can also rotate in the counterclockwise direction and relax the cable 37 to put the second lock assembly 21B in a locked configuration. In the locked configuration, the sled spring 167 (shown in FIG. 9) can push the sled 150 towards the minor bracket 44 to prime the fourth lock 202. When the one or more notches 76 come to a locking position (e.g., one or more notches 76 can be positioned across the one or more pawls 162) through the height adjustment, the one or more pawls 162 can engage with the one or more notches 76, as illustrated in FIG. 14, to immobilize the height adjustment.

FIGS. 15-16 are partial side views of the second lock assembly 21B including the third lock 201 in an unlocked configuration and in a locked configuration, respectively. The sled 150, the brace 151, and the key 152 can cooperate to put the third lock 201 in a locked configuration or in an unlocked configuration as discussed in the following sections.

Figure 17:
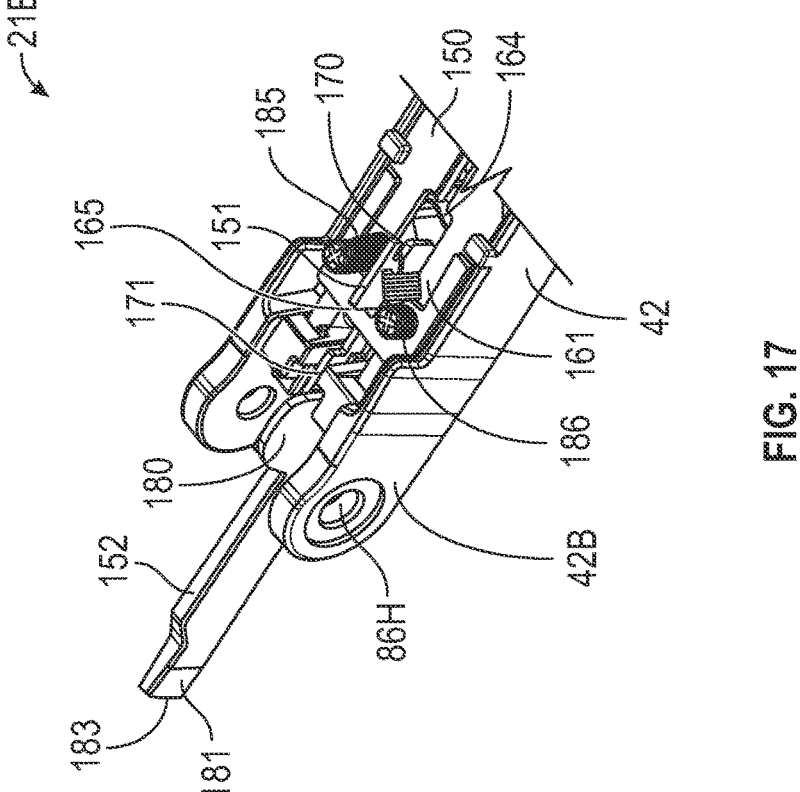
FIG. 17 is a partial enlarged perspective view of the second lock assembly of FIG. 9 in an unlocked configuration.

FIG. 17 is a partial enlarged perspective view of the second lock assembly 21B in an unlocked configuration. The first brace portion 170 of the brace 151 can be located inside the elongated slot 164 of the sled 150, and the second brace portion 171 of the brace 151 can be operably coupled to the first key portion 180 of the key 152. In the unlocked configuration, the sled 150 can move away from the second portion 42B towards the first portion 42A of the second link arm 42. The bridge 165 can contact the first end 175 of the cavity 174 on the brace 151 (shown in FIG. 11) and move the brace 151 away from the second portion 42B of the second link arm 42 (e.g., move the brace 151 away from the minor bracket 44). Since the key 152 is coupled to the brace 151, the key 152 can also move with the brace 151 towards the second link arm 42 (e.g., move away from the pan bracket 51) by sliding relative to the minor bracket 44 in the unlocked configuration. In the unlocked configuration, the tip 183 of the key 152 can disengage from the second slot 98 located on the pan bracket 51, as illustrated in FIG. 15, to enable the pan bracket 51 to rotate about the third axis 13 relative to the minor bracket 44.

Figure 18:
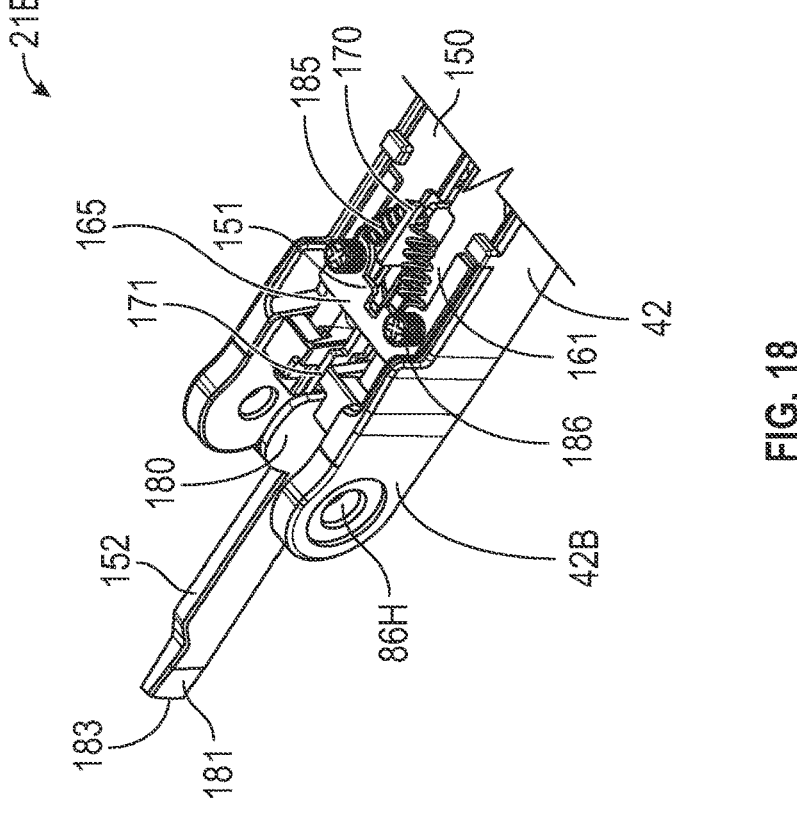
FIG. 18 is a partial enlarged perspective view of the second lock assembly of FIG. 9 in a locked configuration.

FIG. 18 is a partial enlarged perspective view of the second lock assembly 21B in a locked configuration. In the locked configuration, the sled spring 167 (shown in FIG. 9) can push the sled 150 towards the second portion 42B of the second link arm 42 (e.g., push the sled 150 towards the minor bracket 44). The brace 151 can be coupled to the sled 150 via the one or more brace springs 185. The brace springs 185 can bias the brace 151 towards the minor bracket 44. Since the key 152 is coupled to the brace 151, the key 152 can slide relative to the minor bracket 44 towards the pan bracket 51. The tip 183 of the key 152 can approach the pan bracket 51 to prime the fourth lock 202 (e.g., put the fourth lock 202 in a primed configuration). In the primed configuration of the fourth lock 202, the tip 183 can contact the protrusion 97 of the pan bracket 51 proximate the fifth portion 95. The first end 175 of the cavity 174 of the brace 151 can separate from the bridge 165 stretching the one or more brace springs 185, as illustrated in FIG. 18. The one or more brace springs 185 can continue biasing the key 152 towards the pan bracket 51. When the pan bracket 51 is rotated about the third axis 13, the pan bracket 51 can come to a locking position (e.g., the second slot 98 can line up with the tip 183 of the key 152). The tip 183 can enter in to the second slot 98 to activate the third lock 201 and lock the third joint 55, as illustrated in FIG. 16, in the locked configuration.

In some example configurations, actuation of the actuator 35 (e.g., turning the knob) can actuate all four locks (the first lock 101, the second lock 102, the third lock 201, or the fourth lock 202) such that the four locks are primed to engage and will lock when certain positioning criteria have been met. In the examples described above, actuating the actuator 35 can bias first pin 112 of the first lock 101 and the second pin 113 of the second lock 102 towards engagement with the pin receiving aperture 32 and the first slot 68, respectively, shown in FIG. 8. The first pin 112 of the first lock 101 can only engage with the pin receiving aperture 32 of the support structure 25 or the base 22 when the extension arm 23 is in a selected, pre-defined rotational orientation with respect to the support structure 25 or the base 22. In such an example, after actuation of the arm locking system 21, the extension arm 23 can be rotated about the first joint 28 until the first pin 112 and pin receiving aperture 32 align to thereby engage the first lock 101. It should be appreciated that the first lock 101 may simultaneously actuate and engage if the extension arm 23 is in the proper rotational alignment with respect to the support structure 25 or base 22 when the arm locking system 21 is actuated.

In some example configurations, the second pin 113 of the second lock 102 can only engage with the first slot 68 of the major bracket 43 when the lift arm 24 is in a selected, pre-defined rotational orientation with respect to the extension arm 23 to actuate the second lock 102. In such an example, after actuation of the arm locking system 21, the lift arm 24 can be rotated about the second axis 12 of the second joint 31 until the second pin 113 and the first slot 68 of the major bracket 43 align to thereby engage the second lock 102. In some examples, this rotational alignment will vertically align the extension arm 23 and the lift arm 24. It should be appreciated that the second lock 102 may simultaneously actuate and engage if the lift arm 24 is in the proper rotational alignment with respect to the extension arm 23 when the arm locking system 21 is actuated.

In some example configurations, the one or more pawls 162 of the sled 150 can only engage with the one or more notches 76 of the minor bracket 44 when the fourth portion 30 of the lift arm 24 is in a selected, pre-defined vertical orientation with respect to the support structure 25, base 22 or extension arm 23. In such an example, after actuation of the arm locking system 21, the lift arm 24 can be pivoted about the generally horizontal axis 46 of the lift joint 45 until the one or more pawls 162 and one or more notches 76 engage to thereby engage the fourth lock 202. It should be appreciated that the fourth lock 202 may simultaneously actuate and engage if the fourth portion 30 of the lift arm 24 is in the proper vertical height position with respect to the extension arm 23 or base 22 when the arm locking system 21 is actuated.

Also, in some example configurations, the tip 183 of the key 152 can only engage with the second slot 98 of the pan bracket 51 when the pan bracket 51 is in a selected, pre-defined rotational orientation with respect to the minor bracket 44 to actuate the third lock 201. In such an example, after actuation of the arm locking system 21, the pan bracket 51 can be rotated about the third axis 13 of the third joint 55 until the tip 183 of the key 152 and the second slot 98 of the pan bracket 51 align to thereby engage the third lock 201. It should be appreciated that the third lock 201 may simultaneously actuate and engage if the pan bracket 51 is in the proper rotational alignment with respect to the minor bracket 44 when the arm locking system 21 is actuated.

Figures 19, 20:
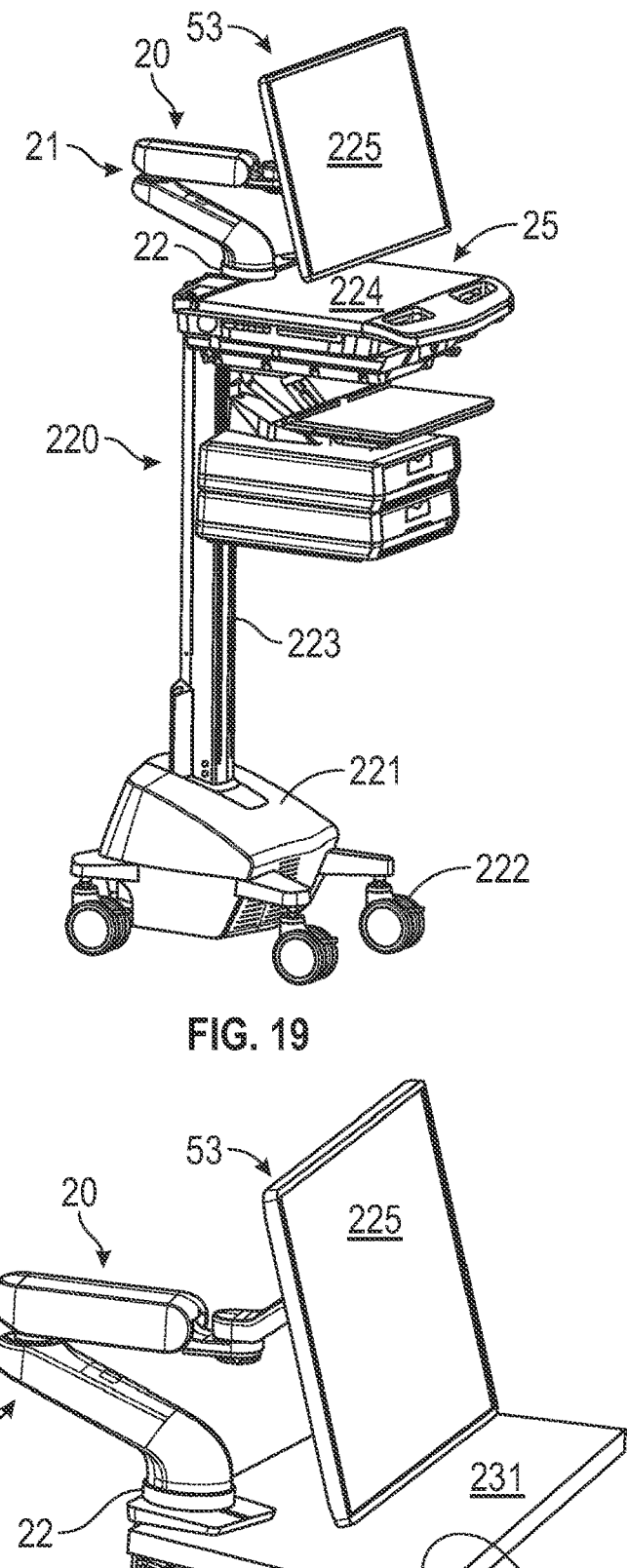
FIG. 19 is a perspective view of the arm assembly of FIG. 1 mounted on a cart according to an example configuration of the current disclosure.
FIG. 20 is a perspective view of the arm assembly of FIG. 1 mounted on a work surface according to an example configuration of the current disclosure.

One or more examples disclosed in previous sections can be used to mount the arm assembly on any type of a support structure. In some example configurations, the support structure 25 can include a cart 220. The cart 220 can include a base 221 with one or more wheels 222, as illustrated in FIG. 19. The cart 220 can also include a riser 223 coupled to the base 221. A work surface 224 can be coupled to the riser 223 away from the base 221. In some example configurations, the work surface 224 can be height adjustable relative to the base 221. An arm assembly 20 can be coupled to the cart 220. The arm assembly 20 can include a base 22 and an interface plate 53. The base 22 can be coupled to the cart (e.g., coupled to the work surface 224 or the riser 223). The interface plate 53 can be adapted to receive an electronic display 225. The arm assembly 20 can provide some articulation (e.g., push, pull, elevate, rotate, or the like) for the electronic display 225 relative to the cart 220. The arm assembly 20 can include an arm locking system 21. The arm locking system 21 can enable locking one or more joints of the arm assembly 20 to maintain the position of the electronic display 225 relative to the cart 220.

FIG. 20 illustrates an example configuration in which the base 22 can be coupled to a clamp 230. The arm assembly 20 can be mounted to an edge of the support structure 25 via the clamp 230. The support structure 25 can include a horizontal work surface 231 (e.g., a desk or tabletop). The arm assembly 20 can include an interface plate 53 adapted to receive an electronic display 225. The arm assembly 20 can provide some articulation (e.g., push, pull, elevate, rotate, or the like) for the electronic display 225 relative to the cart work surface 231. The arm assembly 20 can include an arm locking system 21. The arm locking system 21 can enable locking one or more joints of the arm assembly 20 to maintain the position of the electronic display 225 relative to the work surface 231.

Figure 21:
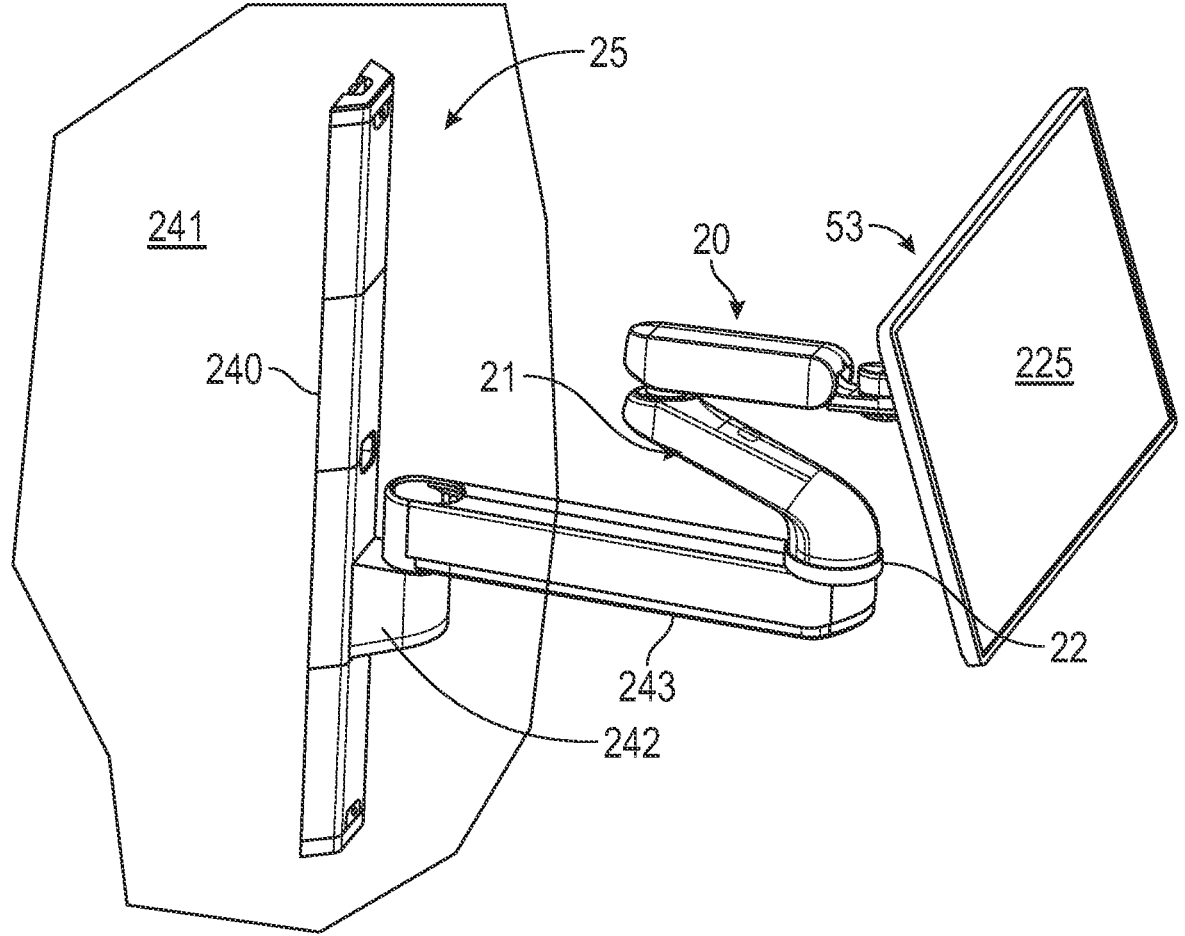
FIG. 21 is a perspective view of the arm assembly of FIG. 1 mounted on a wall according to an example configuration of the current disclosure.

FIG. 21 is yet another example configuration in which the support structure 25 can include a wall plate 240 for attaching to vertical surface 241, such as a wall. The wall plate 240 can include a wall plate base 242. An additional arm 243 can be rotatably coupled to the wall plate base 242. The arm assembly 20 can include a base 22 and an interface plate 53. The base 22 can be coupled to the additional arm 243. The interface plate 53 can be adapted to receive an electronic display 225. The arm assembly 20 can provide some articulation (e.g., push, pull, elevate, rotate, or the like) for the electronic display 225 relative to the wall plate 240. The arm assembly 20 can include an arm locking system 21. The arm locking system 21 can enable locking one or more joints of the arm assembly 20 to maintain the position of the electronic display 225 relative to the wall plate 240.

The following, non-limiting examples, detail certain aspects of the present subject matter to solve the challenges and provide the benefits discussed herein, among others.

Example 1 is an arm assembly, comprising: a support structure including a base; an extension arm; a first joint to rotatably couple the extension arm to the support structure; a lift arm including a height-adjustable portion; a second joint to rotatably couple the lift arm to the extension arm opposite the support structure; a head assembly adapted to receive an electronic display, the height-adjustable portion adjusts a height of the electronic display relative to the base; a third joint to rotatably couple the head assembly to the lift arm opposite the extension arm; and an arm locking system including: a first lock assembly coupled to the extension arm and including: a first lock operable to selectively prevent movement of the extension arm relative to the support structure at the first joint; and a second lock operable to selectively prevent movement of the lift arm relative to the extension arm at the second joint; and a second lock assembly coupled to the lift arm and including: a third lock operable to selectively prevent movement of the head assembly relative to the lift arm at the third joint; and a fourth lock operable to selectively prevent movement of the height-adjustable portion; wherein the first lock assembly and the second lock assembly cooperate to maintain a position of the electronic display relative to the base or to permit movement of the electronic display relative to the base; and wherein each of the first lock, the second lock, the third lock, and the height-adjustable portion is independently operable.

In Example 2, the subject matter of Example 1 optionally includes wherein the lift arm comprises a four-bar linkage including: a major bracket rotatably coupled to the extension arm to form the first joint, the major bracket including: a first slot; a minor bracket rotatably coupled to the extension arm to form the second joint, the minor bracket including: one or more notches; and an aperture; a first link arm rotatably coupled to the major bracket and the minor bracket; and a second link arm rotatably coupled to the major bracket opposite the first link arm and the minor bracket; wherein the first link arm and the second link arm are configured to rotate about a horizontal first axis to enable height adjustment of the minor bracket relative to the major bracket.

In Example 3, the subject matter of Example 2 optionally includes the head assembly comprises: a pan bracket extending along the head assembly, the pan bracket including a protrusion having a second slot proximate a portion of the pan bracket rotatably coupled to the minor bracket at the third joint; and a tilt assembly coupled to the pan bracket opposite the protrusion such that the tilt assembly is adjacent the electronic display; the tilt assembly includes an interface bracket rotatably coupled to the pan bracket about a horizontal second axis; wherein the aperture of the minor bracket is adapted to receive the protrusion of the pan bracket to form the third joint; wherein the pan bracket is rotatably coupled to the minor bracket at the third joint, and wherein the interface bracket is adapted to receive the electronic display.

In Example 4, the subject matter of any one or more of Examples 2-3 optionally include wherein the lift arm also comprises a counterbalance mechanism coupled to the first link arm, wherein the counterbalance mechanism is configured to counter a weight of the electronic display coupled to the head assembly.

In Example 5, the subject matter of any one or more of Examples 2-4 optionally include wherein the second lock assembly is coupled to the second link arm.

In Example 6, the subject matter of any one or more of Examples 3-5 optionally include wherein the second lock assembly comprises: a sled slidably engaged with the second link arm, the sled includes one or more pawls proximate a portion of the sled extending towards the minor bracket; a key slidably engaged with the minor bracket; and a brace operably coupled to the sled, the brace extending away from the sled to couple to the key.

In Example 7, the subject matter of Example 6 optionally includes wherein the second lock assembly also comprises: a sled spring coupled between the sled and the second link arm; wherein the sled spring biases the sled towards minor bracket, and a brace spring coupled between the brace and the sled; wherein the brace spring biases the brace towards the minor bracket and biases the key towards the protrusion of the pan bracket.

In Example 8, the subject matter of Example 7 optionally includes wherein the arm locking system also comprises an actuator, wherein the actuator is coupled to the extension arm and operably coupled to the first lock assembly and the second lock assembly; wherein the actuator is rotatable relative to the extension arm to put the actuator in a locked configuration and an unlocked configuration; and wherein the arm locking system is actuatable by rotating the actuator between the locked configuration and the unlocked configuration.

In Example 9, the subject matter of Example 8 optionally includes the arm locking system also comprises a cable having a first portion operably coupled to the actuator and a second portion coupled to the sled; wherein the cable is routed through the extension arm, the major bracket, and the second link arm between the first portion and the second portion.

In Example 10, the subject matter of Example 9 optionally includes wherein the first lock includes a first engagement member having a first pin, and the second lock includes a second engagement member having a second pin; wherein the actuator is operably coupled to the first engagement member and the second engagement member by a first arm and a second arm, respectively; and wherein at least one of the first engagement member and the second engagement member include a lock biasing element engaging at least one of the first pin and the second pin.

In Example 11, the subject matter of Example 10 optionally includes wherein when the actuator is in the locked configuration each of the first lock, the second lock, the third lock, and the fourth lock is positioned in a primed configuration to lock; and wherein when each of the first joint, the second joint, and the third joint and an elevation of the minor bracket are positioned in a locking position, each of the first lock, the second lock, the third lock, and the fourth lock is engaged, respectively, to put each of the first lock, the second lock, the third lock, and the fourth lock into a locked state.

In Example 12, the subject matter of Example 11 optionally includes wherein in the primed configuration of the first lock, the first pin of the first engagement member is ready to engage with a pin receiving aperture of the base; wherein in the primed configuration of the second lock, the second pin of the second engagement member is ready to engage with the first slot located on the major bracket; wherein in the primed configuration of the third lock, the key is ready to engage with the second slot located on the protrusion of the pan bracket, and wherein in the primed configuration of the fourth lock, the one or more pawls of the sled are ready to engage with the one or more notches located on the minor bracket.

In Example 13, the subject matter of Example 12 optionally includes wherein in the locked state of the first lock, the first pin engages with the pin receiving aperture of the base; wherein in the locked state of the second lock, the second pin engages with the first slot located on the first portion of the major bracket; wherein in the locked state of the third lock, the key engages with the second slot located on the protrusion of the pan bracket; and wherein in the locked state of the fourth lock, the one or more pawls of the sled engage with the one or more notches of the minor bracket.

In Example 14, the subject matter of any one or more of Examples 10-13 optionally include wherein when the actuator is in the unlocked configuration each of the first lock, the second lock, the third lock, and the fourth lock are unlocked; wherein in the unlocked configuration of the actuator, a position of the electronic display is changeable by moving the arm assembly about at least one of the first joint, the second joint, or the third joint and by adjusting a height of the lift arm relative to the base.

In Example 15, the subject matter of any one or more of Examples 1-14 optionally include wherein the base includes a clamp.

In Example 16, the subject matter of any one or more of Examples 1-15 optionally include wherein the support structure includes a cart.

In Example 17, the subject matter of any one or more of Examples 1-16 optionally include wherein the support structure includes a desk.

In Example 18, the subject matter of any one or more of Examples 1-17 optionally include wherein the support structure includes a wall mounting plate.

In Example 19, the subject matter of any one or more of Examples 1-18 optionally include wherein the extension arm has a fixed height relative to the base.

In Example 20, the subject matter of any one or more of Examples 1-19 optionally include wherein the first joint rotatably couples the extension arm to the base.

Each of these non-limiting examples can stand on its own or can be combined in any permutation or combination with any one or more of the other examples.

The above-detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5). Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The invention claimed is:

1. An arm assembly, comprising:
a support structure including a base;
an extension arm;
a first joint to rotatably couple the extension arm to the support structure;
a lift arm including a height-adjustable portion;
a second joint to rotatably couple the lift arm to the extension arm opposite the support structure;
a head assembly adapted to receive an electronic display, the height-adjustable portion adjusts a height of the electronic display relative to the base;
a third joint to rotatably couple the head assembly to the lift arm opposite the extension arm; and
an arm locking system including:
a first lock assembly coupled to the extension arm and including:
a first lock operable to selectively prevent movement of the extension arm relative to the support structure at the first joint; and
a second lock operable to selectively prevent movement of the lift arm relative to the extension arm at the second joint; and
a second lock assembly coupled to the lift arm and including:
a third lock operable to selectively prevent rotation of the head assembly relative to the lift arm at the third joint; and
a fourth lock operable to selectively prevent translation of the head assembly relative to the support structure by the height-adjustable portion;
wherein:
the first lock assembly and the second lock assembly cooperate to maintain a position of the electronic display relative to the base or to permit movement of the electronic display relative to the base; and
each of the first lock, the second lock, the third lock, and the fourth lock are independently operable.

2. The arm assembly of claim 1, wherein the lift arm includes a four-bar linkage including:
a major bracket rotatably coupled to the extension arm to form the first joint, the major bracket including:
a first slot;
a minor bracket rotatably coupled to the extension arm to form the second joint, the minor bracket including:
one or more notches; and
an aperture;
a first link arm rotatably coupled to the major bracket and the minor bracket; and a second link arm rotatably coupled to the major bracket opposite the first link arm and the minor bracket;
wherein the first link arm and the second link arm are configured to rotate about a horizontal first axis to enable height adjustment of the minor bracket relative to the major bracket.

3. The arm assembly of claim 2, wherein the head assembly includes:
a pan bracket extending along the head assembly, the pan bracket including a protrusion having a second slot proximate a portion of the pan bracket rotatably coupled to the minor bracket at the third joint; and
a tilt assembly coupled to the pan bracket opposite the protrusion such that the tilt assembly is adjacent the electronic display, the tilt assembly including an interface bracket rotatably coupled to the pan bracket about a horizontal second axis;
wherein;
the aperture of the minor bracket is adapted to receive the protrusion of the pan bracket to form the third joint;
the pan bracket is rotatably coupled to the minor bracket at the third joint; and
the interface bracket is adapted to receive the electronic display.

4. The arm assembly of claim 2, wherein the lift arm includes a counterbalance mechanism coupled to the first link arm, the counterbalance mechanism is configured to counter a weight of the electronic display coupled to the head assembly.

5. The arm assembly of claim 2, wherein the second lock assembly is coupled to the second link arm.

6. The arm assembly of claim 3, wherein the second lock assembly includes:
a sled slidably engaged with the second link arm, the sled including one or more pawls proximate a portion of the sled extending towards the minor bracket;
a key slidably engaged with the minor bracket; and
a brace operably coupled to the sled, the brace extending away from the sled to couple to the key.

7. The arm assembly of claim 6, wherein the second lock assembly includes:
a sled spring coupled between the sled and the second link arm, the sled spring biasing the sled towards the minor bracket; and
a brace spring coupled between the brace and the sled, the brace spring biasing the brace towards the minor bracket and biasing the key towards the protrusion of the pan bracket.

8. The arm assembly of claim 7, wherein:
the arm locking system includes an actuator coupled to the extension arm and operably coupled to the first lock assembly and the second lock assembly;
the actuator is rotatable relative to the extension arm to put the actuator in a locked configuration and an unlocked configuration; and
the arm locking system is actuatable by rotating the actuator between the locked configuration and the unlocked configuration.

9. The arm assembly of claim 8, wherein:
the arm locking system includes a cable having a first portion operably coupled to the actuator and a second portion coupled to the sled; and
the cable is routed through the extension arm, the major bracket, and the second link arm between the first portion and the second portion.

10. The arm assembly of claim 9, wherein:

the first lock includes a first engagement member having a first pin;

the second lock includes a second engagement member having a second pin;

the actuator is operably coupled to the first engagement member and the second engagement member by a first arm and a second arm, respectively; and at least one of the first engagement member and the second engagement member include a lock biasing element engaging at least one of the first pin and the second pin.

11. The arm assembly of claim 10, wherein:

when the actuator is in the locked configuration each of the first lock, the second lock, the third lock, and the fourth lock is positioned in a primed configuration to lock; and when each of the first joint, the second joint, and the third joint and an elevation of the minor bracket are positioned in a locking position, each of the first lock, the second lock, the third lock, and the fourth lock is engaged, respectively, to put each of the first lock, the second lock, the third lock, and the fourth lock into a locked state.

12. The arm assembly of claim 11, wherein;

in the primed configuration of the first lock, the first pin of the first engagement member is ready to engage with a pin receiving aperture of the base;

in the primed configuration of the second lock, the second pin of the second engagement member is ready to engage with the first slot located on the major bracket;

in the primed configuration of the third lock, the key is ready to engage with the second slot located on the protrusion of the pan bracket; and in the primed configuration of the fourth lock, the one or more pawls of the sled are ready to engage with the one or more notches located on the minor bracket.

13. The arm assembly of claim 12, wherein:

in the locked state of the first lock, the first pin engages with the pin receiving aperture of the base;

in the locked state of the second lock, the second pin engages with the first slot located on the first portion of the major bracket;

in the locked state of the third lock, the key engages with the second slot located on the protrusion of the pan bracket; and in the locked state of the fourth lock, the one or more pawls of the sled engage with the one or more notches of the minor bracket.

14. The arm assembly of claim 10, wherein:

when the actuator is in the unlocked configuration each of the first lock, the second lock, the third lock, and the fourth lock are unlocked; and in the unlocked configuration of the actuator, a position of the electronic display is changeable by moving the arm assembly about at least one of the first joint, the second joint, or the third joint and by adjusting a height of the lift arm relative to the base.

15. The arm assembly of claim 1, wherein the base includes a clamp.

16. The arm assembly of claim 1, wherein the support structure includes a cart.

17. The arm assembly of claim 1, wherein the support structure includes a desk.

18. The arm assembly of claim 1, wherein the support structure includes a wall mounting plate.

19. The arm assembly of claim 1, wherein the extension arm has a fixed height relative to the base.

20. The arm assembly of claim 1, wherein the first joint rotatably couples the extension arm to the base.

* * * * *